United States Patent [19]
Jilbert

[11] 3,859,700
[45] Jan. 14, 1975

[54] INSERTED BLADE CUTTER

[75] Inventor: Richard Robert Jilbert, Chicago, Ill.

[73] Assignee: Illinois Tool Works Inc., Chicago, Ill.

[22] Filed: May 7, 1974

[21] Appl. No.: 467,758

[52] U.S. Cl.................... 29/96, 29/95.1, 29/103 A, 29/105 R, 408/233, 408/239
[51] Int. Cl............................................. B26d 1/00
[58] Field of Search....... 29/96, 95.1, 105 R, 103 A; 408/201, 233, 239

[56] References Cited
UNITED STATES PATENTS

| | | | |
|---|---|---|---|
| 1,016,116 | 1/1912 | Walters | 408/201 |
| 1,047,466 | 12/1912 | Wagner | 408/233 |
| 2,758,363 | 8/1956 | Praeg | 29/105 R |
| 3,528,154 | 9/1970 | Schmidt | 29/95.1 |
| 3,646,650 | 3/1972 | Milewski | 29/105 R |
| 3,667,768 | 6/1972 | Stokey | 408/239 |
| 3,791,001 | 2/1974 | Bennett | 29/105 R |

Primary Examiner—Leonidas Vlachos
Attorney, Agent, or Firm—Robert W. Beart; Thomas W. Buckman

[57] ABSTRACT

A tool assembly including a holder with a slot to receive a cutter blade. The base of the slot and the base of the blade including cooperating, mating, generally V-shaped, alignment surfaces which, in conjunction, with a fastener extending along the axis of the holder, serves to accurately clamp the blade within the slot.

11 Claims, 7 Drawing Figures

INSERTED BLADE CUTTER

BACKGROUND OF THE INVENTION

This invention relates generally to an inserted blade cutter and more particularly concerns a cutter assembly in which the blade can be easily and accurately located and clamped in the holder.

Inserted blade cutter assemblies have been known and used for many years but they are not totally acceptable in high precision work and particularly high precision work where a predetermined form is to be cut in a workpiece. Prior art cutter assemblies are not generally capable of consistent, accurate blade positioning within the blade holder, due to various tolerances inherent in prior art blade clamping systems.

The use of a plurality of blade inserts in a single holder has compounded the alignment problems in the sense that the inserts must be aligned with each other as well as retaining accurate alignment relative to the holder as the tool is used.

SUMMARY OF THE INVENTION

It is an object of this invention to provide a cutting tool assembly in which a single inserted blade is utilized and which single blade is accurately aligned within the tool holder.

It is another object of the invention to provide an inserted blade cutting assembly which is self-aligning within the tool holder as it is clamped therein.

An advantage of the invention is the ability to provide a replaceable cutting tool with a form-type cutting edge and a tool holder which will insure that an accurate predetermined form is cut in a workpiece.

The foregoing objects and advantages are achieved by a tool holder with a through slot formed at one extremity of the tool in which is provided a pair of accurately ground locating surfaces extending at an angle to one another and adapted to accurately mate with corresponding accurately ground surfaces on the base of a removable cutting blade. The blade and holder are drawn together and clamped through the use of a fastening element extending on the axis of the holder and through the apices of the respective ground surfaces. A single blade configured in accordance with the invention is capable of self-alignment as it is pulled into the holder of the slot and clamped therein. The blade is further retained by a fastener extending transverse both the slot and the blade to clamp the sides of the slot to the associated sides of the blade.

Other objects and advantages will become apparent when the following description is read in conjunction with the accompanying drawings.

DESCRIPTION OF THE PREFERRED EMBODIMENT

Figure 1:
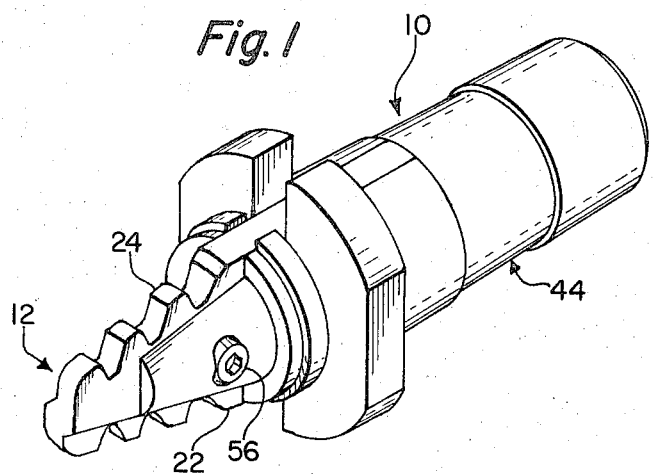
FIG. 1 is a perspective view of a tool assembly showing the blade clamped within a slot in a tool holder.

The high precision cutter assembly shown in FIG. 1 essentially comprises a unitary cutter holder 10 and a single replaceable blade 12 having a pair of longitudinally extending cutting edges 22 and 24 and associated flute portions 28 which aid in removal of chips.

Figure 2:
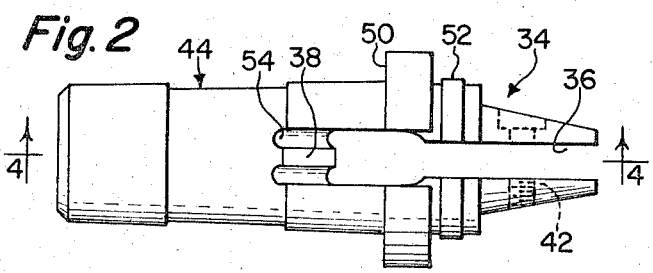
FIG. 2 is a top view of the tool holder of the invention.
Figure 3:
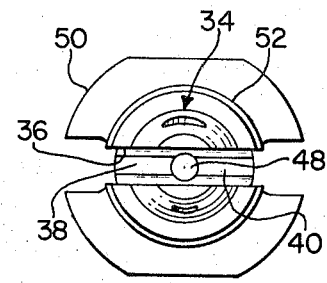
FIG. 3 is an end view of the tool holder shown in FIG. 2.
Figure 4:
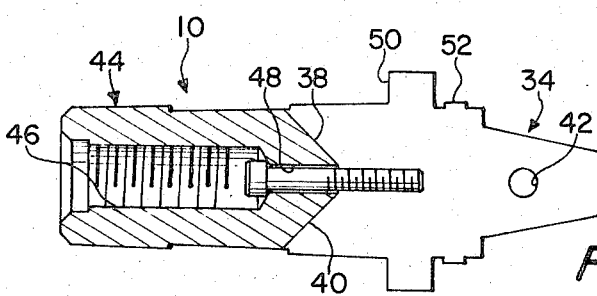
FIG. 4 is a cross-sectional view taken along the lines 4—4 of FIG. 2 and additionally showing the clamping bolt extending through the apex of the locating surfaces.

As will be seen from FIGS. 2–4, the clamping extremity 34 of this tool holder 10 is provided with a through slot 36 extending from the extremity of this portion along the longitudinal axis of the holder and terminating intermediate the extremities of the holder. The termination point of the slot is a generally V-shaped base which includes a pair of accurately ground, flat surfaces 38 and 40. These surfaces serve as the locating means for the blade, as will be later set forth herein. The surfaces 38 and 40 extend in planes, which are perpendicular to the plane including the slot and which intersect at an apex located on the longitudinal axis of the holder. The preferable included angle of these surfaces is approximately 90°.

The extremity of the holder opposite the clamping extremity 34 may be in the form of a shank portion of any suitable design for association with a chuck member which carries the entire assembly during operative association with a workpiece. This shank portion 44 is provided with a bore 46, coincident with the axis of the holder, and which narrows to a bore 48 extending through the base of the slot. A threaded fastener member is associated with the bore, passing therethrough so that the head of the fastener is clamped on one side of the bore 48 and the threaded shank portion of the fastener extends into the slot.

Figure 5:
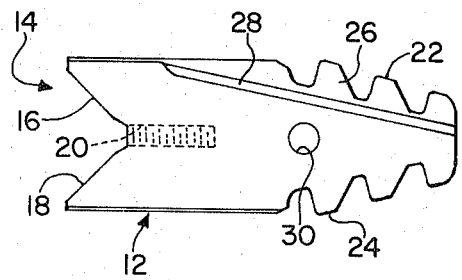
FIG. 5 is a side view of the cutter blade used in association with the holder of FIG. 2.
Figures 6, 7:
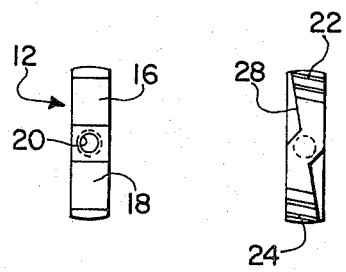
FIG. 6 is a rear end view of the cutter blade shown in FIG. 5.
FIG. 7 is a front end view of the cutter blade shown in FIG. 5.

The single cutting blade 12 adapted for use in the present invention can clearly be seen in FIGS. 5–7. The base 14 of this blade will have a recess which includes a pair of accurately ground, flat locating surfaces 16 and 18. These locating surfaces are disposed in planes which are preferably at right angles to the longitudinal plane of the flat blade. The planes including these locating surfaces will also preferably intersect at the longitudinal axis of the blade and at an angle of approximately 90° to one another. These mating surfaces 16 and 18 will thus accurately dovetail in a substantially self-aligning association as the blade is inserted axially in the slot 36.

The base of the blade will be provided with a threaded bore extending substantially along the longitudinal axis thereof and at the apex of the intersection of the locating surfaces 16 and 18.

The blade 12 and the holder 10 may thus be readily and accurately clamped together for cutting operations by threading the bolt 49 into the bore 20 of the blade and pulling the blade into clamping association with the tool holder. The angled locating surfaces 16 and 18 will be associated with the angled locating surfaces 38 and 40 in such a manner as to accurately self-align the blade within the slot as the blade is pulled axially inwardly of the slot. When the blade has thus been clamped at the base of the slot, a secondary clamping and locating means may be utilized in the form of a threaded fastener 56 extending through aligned holes 42 and 30 in the clamping extremity of the tool and the blade respectively.

The invention thus provides for a rapid and accurate association of a replaceable blade with a tool holder through the use of only two threaded fasteners. It will be noted that the invention is especially useful when the blade 12 is provided with a form-type cutting edge, such as 26. In such a device, diametrically opposed cutting edges along the single blade must be accurately aligned in the tool to produce an identical form in the workpiece as the blade is rotated about its axis.

The tool described above may also include a flange means 50 adjacent the slot to locate the tool holder in the tool holder chuck. In addition, it may be desirable to simultaneously provide a secondary cutting operation to the workpiece, such as by a topping cutter. Such a cutter may be easily associated with the tool holder through the use of a secondary flange 52 and with the cooperation of flange 50.

The base of the slot may include relief areas 54 to enable the locating surfaces 38 and 40 to be accurately ground therein.

In operation, the tool holder may be provided with a rotary motion about its longitudinal axis simultaneous with a feeding motion in which the entire body of the tool is moved laterally. The precise alignment and clamping features of the invention will enable a true form to be cut in a workpiece with a replaceable single cutting blade.

Although the invention has been described in connection with a preferred embodiment, it will be understood that it is not intended to limit the invention to that embodiment. On the contrary it is intended to cover all alternatives, modifications and equivalents as may be included within the spirit and scope of the invention as defined by the appended claims.

I claim:

1. A cutting tool assembly including a holder and removable cutting blade, the tool holder including a slot extending longitudinally from one extremity thereof, the slot terminating in a base portion which includes a pair of accurately machined flat locating surfaces disposed on intersecting planes, the cutting blade including longitudinally extending cutting edge means adapted to extend radially of the tool holder beyond the longitudinal edges of the slot when positioned therein, the base of the blade including a pair of accurately machined flat locating surfaces disposed on intersecting planes, the locating surfaces of the blade and the slot forming complementary, mating abutment means, threaded fastening means extending through the apices of the mating surfaces and adapted to clamp the blade and holder together, fastening means extending transverse the slot to clampingly retain the blade between the sides of the slot.

2. The cutting tool assembly of claim 1, wherein the slot is coincident with the longitudinal axis of the holder.

3. The cutting tool assembly of claim 1, wherein the apices of the locating surfaces of the tool holder and blades are generally located on a plane including the longitudinal axes of the holder and blade respectively.

4. The cutting tool assembly of claim 3, wherein the longitudinal axes of the holder and blade are coincident.

5. The cutting tool assembly of claim 1, wherein the threaded fastening means extend along the longitudinal axes of the blade and holder.

6. The cutting tool assembly of claim 1, wherein the locating surfaces extend in planes which are disposed generally perpendicularly to the plane of the slot.

7. The cutting tool assembly of claim 1, wherein the locating surfaces on the tool holder extend at an angle of approximately 90° to each other.

8. The cutting tool assembly of claim 1, wherein the threaded fastening means comprises a threaded bore formed in the base of the blade through the apex of the intersecting planes and a mating threaded fastener extending through a bore at the apex of the intersecting planes of the slot to pull and clamp the blade and holder together so that the blade is accurately aligned and supported thereby.

9. The cutting tool assembly of claim 1, wherein the blade includes a pair of identical form type cutting edges protruding from the edges of the slot.

10. A cutting tool assembly including a holder and removable cutting blade, the tool holder including a slot extending longitudinally from one extremity and coincident with the longitudinal axis thereof, the slot terminating in a base portion which includes a pair of accurately machined locating surfaces disposed on planes intersecting at an angle of approximately 90°, the apex of these planes located on the longitudinal axis of the holder with the surfaces diverging away from said one extremity of the tool holder, the cutting blade including a pair of longitudinally extending cutting edges adapted to extend radially of the tool holder beyond the longitudinal edges of the slot when the blade is positioned and retained therein, the base of the blade formed with a recess including a pair of accurately machined locating surfaces disposed on planes intersecting at an angle of approximately 90°, the apex of these planes located on the longitudinal axis of the blade, the locating surfaces of the blade and slot forming complementary mating abutment and alignment means, a bore extending from the other extremity of the tool holder intersecting and extending through the base of the slot generally along the longitudinal axis of the holder, a threaded aperture extending along the longitudinal axis of the blade from the recess in the base of the blade, a threaded bolt member inserted through the bore in the base of the slot operatively engaging the complementary threaded aperture to clamp the locating surfaces together and accurately align the blade within the slot, the holder including holes extending therethrough aligned with a hole in the blade so that a fastening member may be associated with the aligned holes to clamp the blade within and between the sides of the slot.

11. The cutting tool assembly of claim 10, wherein the cutting edges are of a predetermined form and tapered toward the longitudinal axis of the blade with the narrowest portion of the blade on the extremity opposite the base of the blade and wherein the form on each cutting edge is substantially identical to accurately cut a predetermining profile in an associated workpiece through rotation of the holder about its longitudinal axis.

* * * * *